(12) United States Patent  
Schwinke et al.

(10) Patent No.: US 7,035,631 B2
(45) Date of Patent: Apr. 25, 2006

(54) TELEMATICS UNIT ACCESS METHOD

(75) Inventors: Steven P. Schwinke, Plymouth, MI (US); William E. Mazzara, Jr., Drayton Plains, MI (US)

(73) Assignee: General Motors Corporation, Detroit, MI (US)

( * ) Notice: Subject to any disclaimer, the term of this patent is extended or adjusted under 35 U.S.C. 154(b) by 399 days.

(21) Appl. No.: 10/386,829

(22) Filed: Mar. 12, 2003

(65) Prior Publication Data

US 2004/0180647 A1    Sep. 16, 2004

(51) Int. Cl.
*H04M 3/00*    (2006.01)

(52) U.S. Cl. .................. 455/420; 455/418; 455/419; 455/423; 455/425

(58) Field of Classification Search ............... 455/92, 455/95, 99, 404.1, 404.2; 701/207, 210, 701/211

See application file for complete search history.

(56) References Cited

U.S. PATENT DOCUMENTS

| 3,644,883 | A | * | 2/1972 | Borman et al. | 340/991 |
| 4,350,969 | A | * | 9/1982 | Greer | 340/994 |
| 6,337,621 | B1 | * | 1/2002 | Ogino et al. | 340/425.5 |
| 6,462,706 | B1 | * | 10/2002 | Decker | 342/357.02 |
| 6,493,629 | B1 | * | 12/2002 | Van Bosch | 701/207 |
| 6,675,006 | B1 | * | 1/2004 | Diaz et al. | 455/404.1 |
| 6,728,612 | B1 | * | 4/2004 | Carver et al. | 701/33 |
| 6,738,914 | B1 | * | 5/2004 | Christopher | 713/323 |
| 6,871,067 | B1 | * | 3/2005 | Clark et al. | 455/428 |

* cited by examiner

*Primary Examiner*—Bing Q. Bui
(74) *Attorney, Agent, or Firm*—Cardinal Law Group

(57) ABSTRACT

The present invention is a system and method of providing access to a telematics unit in a mobile vehicle. A telematics unit access request corresponding to the telematics unit is received, and a mobile identification number and a telematics unit identifier associated with the telematics unit are determined. The mobile identification number and the telematics unit identifier are compared with a database of identifier records, after which a calling-state message is sent to the telematics unit based on the telematics unit access request, the mobile identification number, and the telematics unit identifier.

21 Claims, 3 Drawing Sheets

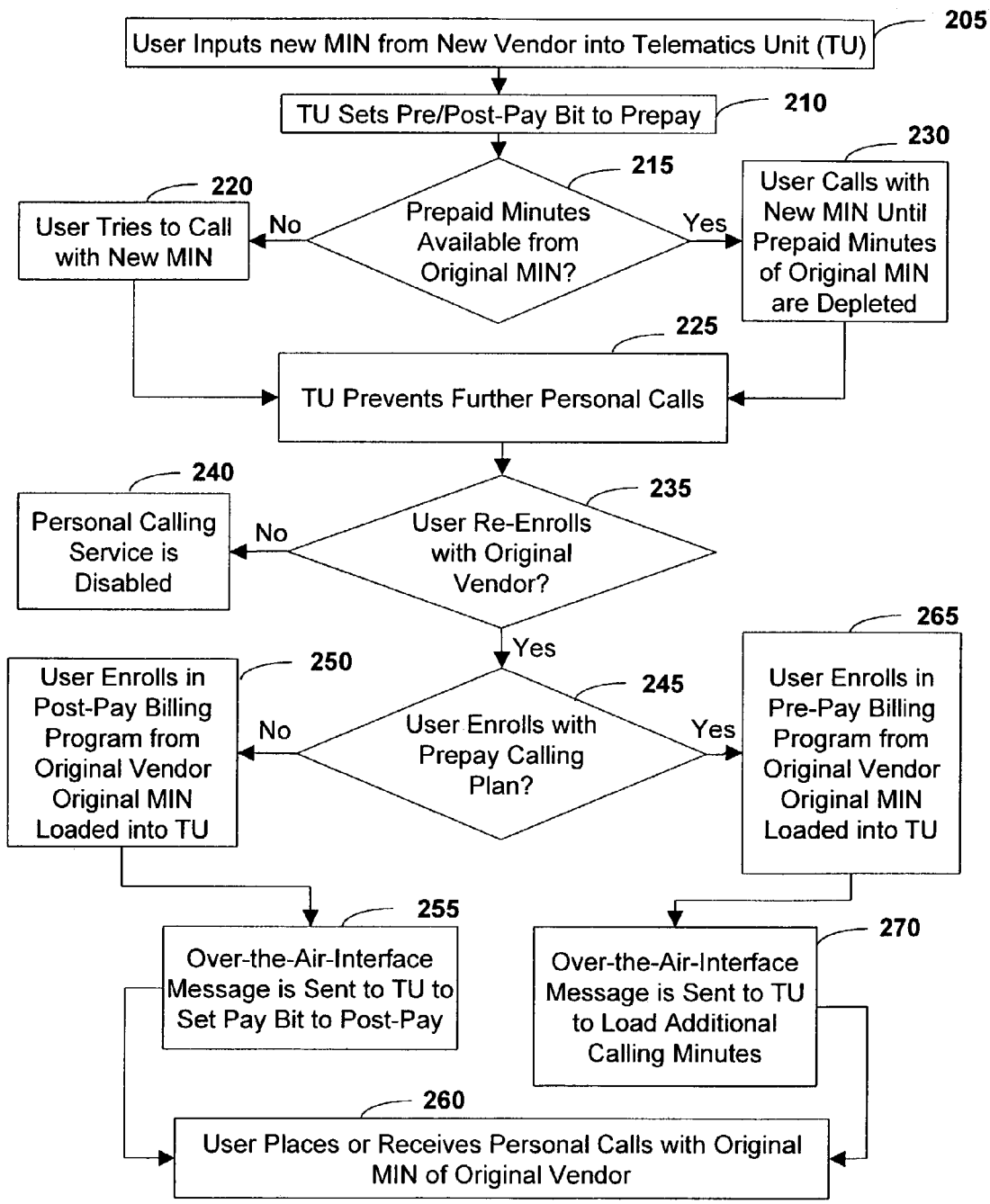

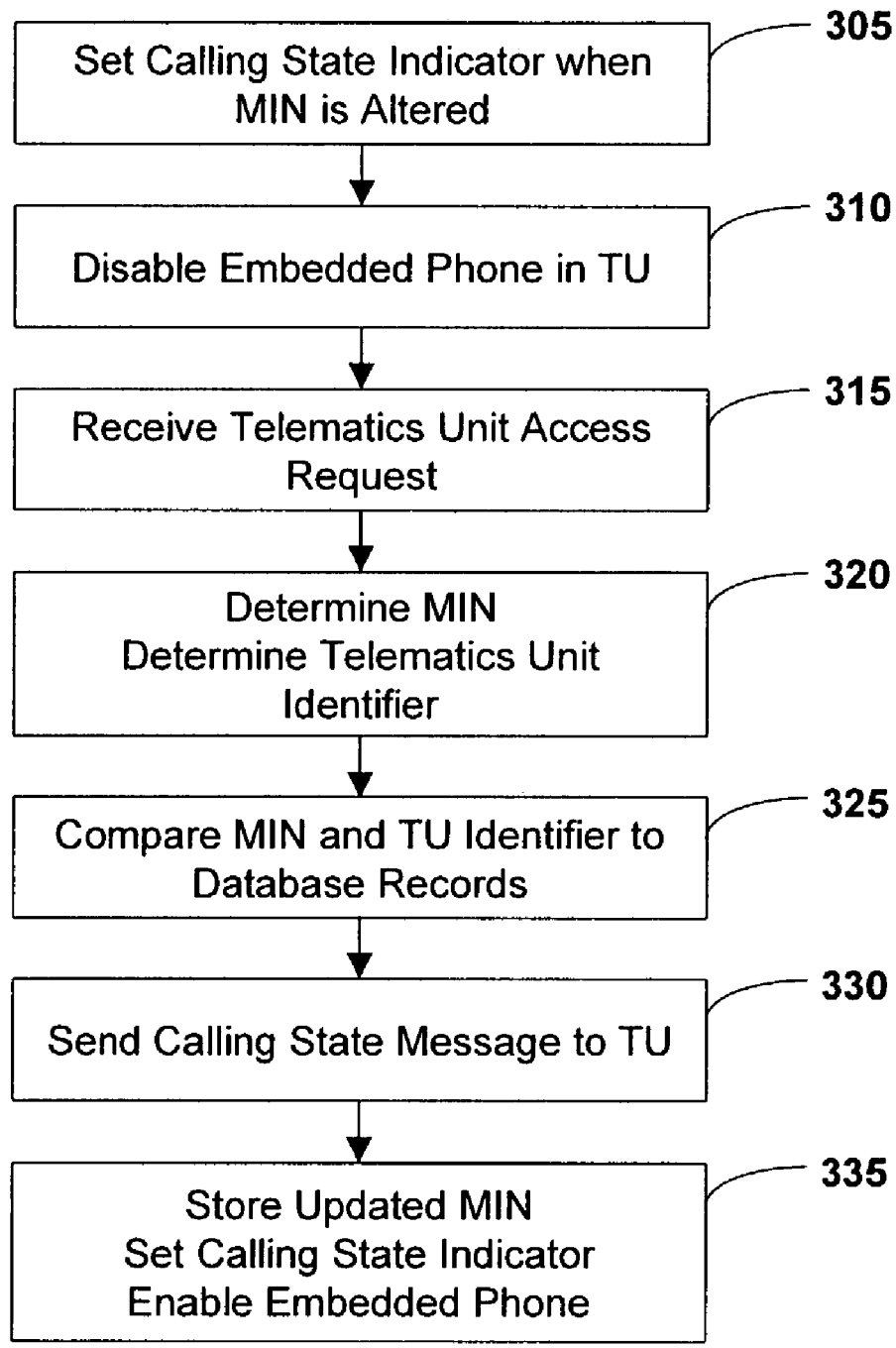

TELEMATICS UNIT ACCESS METHOD

FIELD OF THE INVENTION

This invention relates generally to telematics units for mobile vehicles. In particular, the invention relates to a method and system for controlling call access to and from a cellular phone within an in-vehicle telematics unit.

BACKGROUND OF THE INVENTION

In a typical phone handset of a cellular or mobile phone, a mobile identification number (MIN), i.e. the dialable phone number, and other numbers specific to the cellular phone carrier are usually programmed into the phone through a keypad interface. One of the numbers, a service programming code, is typically a five-digit or six-digit number that may be predefined or randomly assigned. The service programming code may be used to prevent a user from authorized or unauthorized changing the MIN of the cellular phone, but up to this time, the service programming code is often the same number for all cellular phones enrolled with a particular carrier. Once this number is known, the user may change the phone's MIN of a first phone carrier to another MIN from a second carrier without the approval of the first carrier. In order for the user to be locked out of reprogramming the MIN of a phone, the security programming code in each phone would have to be set to a unique number by the phone carrier and would have to be tracked in customer records.

The manual programming mechanisms for programming a cellular phone that are used today do not limit the user from switching to another MIN or another cellular service provider. It is advantageous in some instances, such as during an equipment lease agreement or with embedded phones inside telematics units, for the cellular service provider or equipment manufacturer to control the calling access for a cellular phone and to limit the ability for anyone to change the phone number of the phone.

It is desirable, therefore, to provide a system and method that overcomes the challenges and obstacles described above by controlling the calling access of a cellular phone, and more specifically, the ability for a user to change the phone number and cellular service provider that provide phone connectivity to an in-vehicle telematics unit.

SUMMARY OF THE INVENTION

The present invention is a system and method of providing access to a telematics unit in a mobile vehicle. A telematics unit access request corresponding to the telematics unit is received, and then a mobile identification number and a telematics unit identifier associated with the telematics unit are determined. The mobile identification number and the telematics unit identifier are compared with a database of identifier records, after which a calling-state message is sent to the telematics unit based on the telematics unit access request, the mobile identification number, and the telematics unit identifier.

The updated mobile identification number may be stored and a calling-state indicator may be set based on the calling-state message. An embedded cellular phone may be enabled based on the calling-state indicator.

A calling-state indicator may be set to a predefined billing state when the mobile identification number associated with the telematics unit is altered. The phone may be disabled based on the calling-state indicator.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein:

FIG. 2 is a flow diagram of a method to provide access to a telematics unit in a mobile vehicle, in accordance with one embodiment of the current invention; and FIG. 3 is a flow diagram of a method to provide access to a telematics unit in a mobile vehicle, in accordance with another embodiment of the current invention.

DETAILED DESCRIPTION OF THE PRESENTLY PREFERRED EMBODIMENTS

Figure 1:
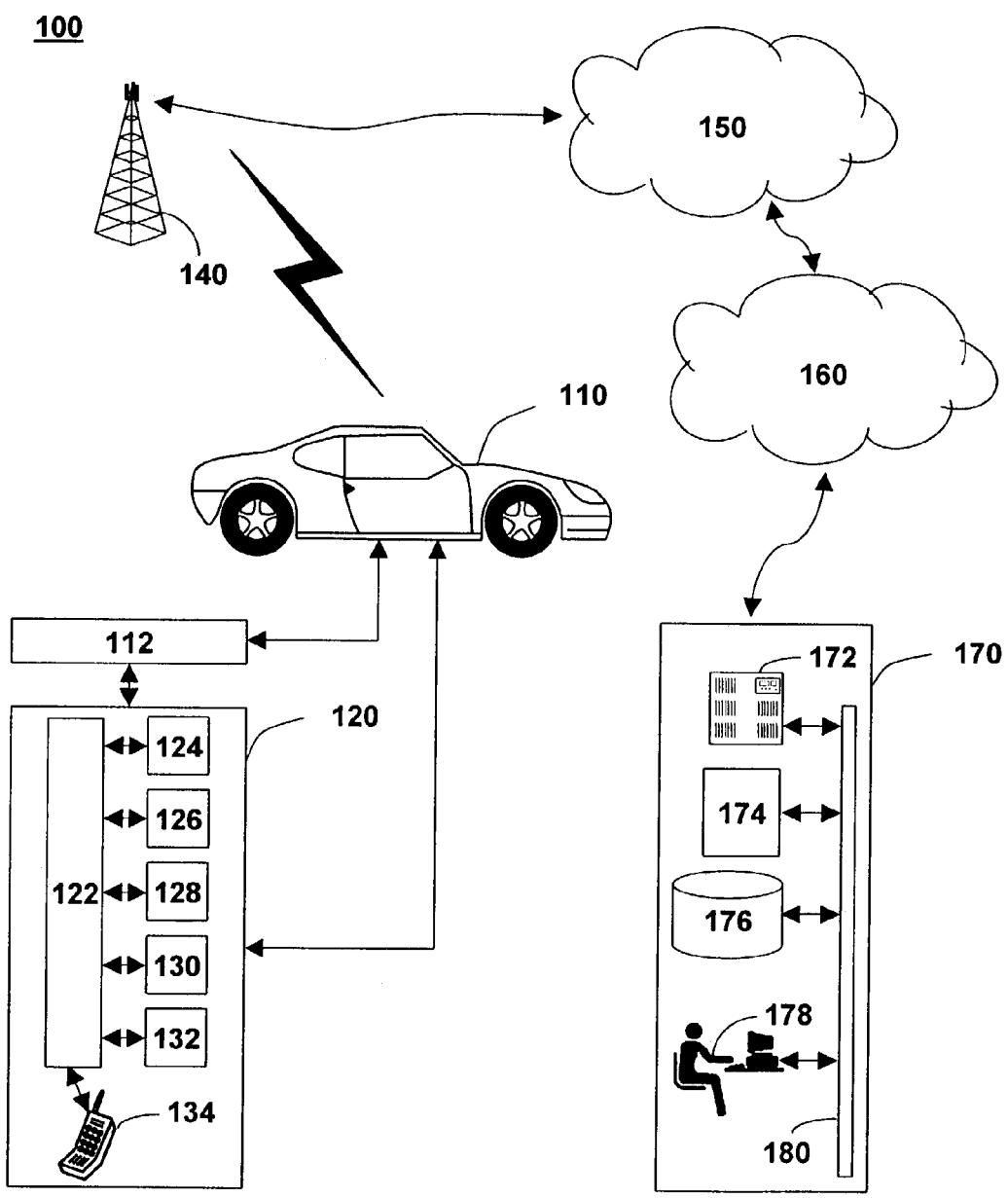
FIG. 1 is a schematic diagram of a system for providing access to a telematics unit in a mobile vehicle, in accordance with one embodiment of the current invention.

FIG. 1 is a schematic diagram of a system for providing access to a telematics unit in a mobile vehicle, in accordance with one embodiment of the present invention at 100. Telematics-unit access system 100 includes a mobile vehicle 110, a telematics unit 120, one or more wireless carrier systems 140, one or more communication networks 150, one or more land networks 160, and one or more call centers 170. Mobile vehicle 110 may be a vehicle such as a car or truck equipped with suitable hardware and software for transmitting and receiving voice and data communications.

Telematics unit 120 may include a digital signal processor (DSP) 122 connected to a wireless modem 124, a global positioning system (GPS) receiver or GPS unit 126, an in-vehicle memory 128, a microphone 130, one or more speakers 132, and an embedded or in-vehicle phone 134. DSP 122 may also be referred to as a microcontroller, controller, host processor, or vehicle communications processor. GPS unit 126 may provide longitude and latitude coordinates of the vehicle. In-vehicle phone 134 may be an analog, digital, dual-mode, dual-band, multi-mode or multi-band cellular phone.

Telematics unit 120 can store MIN numbers in memory 128. Telematics unit 120 can set or reset calling-state indicators and can enable or disable various cellular-phone and telematics-unit functions when directed by microcode running on DSP 122. Telematics unit 120 can send and receive over-the-air messages using, for example, a pseudo-standard air-interface function or other proprietary and non-proprietary communication links.

DSP 122 executes various computer programs and computer program code that control programming and operational modes of electronic and mechanical systems within telematics unit 120. DSP 122 may control communications between telematics unit 120, wireless carrier system 140, and call center 170. A voice-recognition application may be installed in DSP 122 that can translate human voice input through microphone 130 to digital signals. For example, programming of in-vehicle phone 134 may be controlled with verbal commands that are translated by voice-recognition software executed by DSP 122. Alternatively, pushing buttons on an interface of telematics unit 120 or in-vehicle phone 134 may be used to change a phone number and other phone configuration settings. The interface to telematics unit 120 may include one or more buttons on the telematics unit, radio console, or associated keyboard or keypad. The interface to telematics unit 120 may include other forms of preference and data entry including touch-screens, wired or wireless keypad remotes, or other wirelessly connected devices such as Bluetooth-enabled devices.

DSP 122 controls, generates and accepts digital signals transmitted between telematics unit 120 and a vehicle communication bus 112 that is connected to various electronic modules and sensors in mobile vehicle 110. DSP 122 may activate various programming and operation modes, as well as provide for data transfers. Signals from DSP 122 may be translated into voice messages and sent out through speaker 132. One of the generated voice messages may include a phone number prompt given when a user has requested and entered a programming mode of in-vehicle phone 134.

Mobile vehicle 110 via telematics unit 120 may send and receive radio transmissions from wireless carrier system 140. Wireless carrier system 140 may be any suitable system for transmitting a signal from mobile vehicle 110 to communication network 150.

Communication network 150 may comprise services from one or more mobile telephone switching offices and wireless networks. Communication network 150 may connect wireless carrier system 140 to land network 160. Communication network 150 may be any suitable system or collection of systems for connecting wireless carrier system 140 to mobile vehicle 110 and land network 160. Communication network 150 may send and receive short messages according to established protocols such as IS-637 standards for short message service (SMS), IS-136 air-interface standards for SMS, and GSM 03.40 and 09.02 standards. Similar to paging, an SMS communication may be posted along with an intended recipient, such as a communication device in mobile vehicle 110.

Land network 160 is a public-switched telephone network. Land network 160 may be an Internet protocol (IP) network. Land network 160 may be comprised of a wired network, an optical network, a fiber network, another wireless network, or any combination thereof. Land network 160 is connected to one or more landline telephones. Land network 160 may connect communication network 150 to call center 170. Communication network 150 and land network 160 may connect wireless carrier system 140 to a communication node or call center 170.

In one embodiment of the invention, call center 170 may include one or more voice and data switches 172, one or more communication services managers 174, one or more communication services databases 176, one or more communication services advisors 178, and one or more bus systems 180.

Call center 170 may be a location where many calls may be received and serviced at the same time, or where many calls may be sent at the same time. The call center may be a telematics call center, prescribing communications to and from telematics unit 120 in mobile vehicle 110. The call center may be a voice call center, providing verbal communications between an advisor in the call center and a subscriber in a mobile vehicle. The call center may contain each of these functions. Call center 170 may receive a telematics unit access request from a telematics user via wireless carrier system 140, communication network 150, over land network 160, or any combination thereof.

Call center 170 may contain one or more voice and data switches 172. Switch 172 may be connected to land network 160. Switch 172 may transmit voice or data transmissions from call center 170. Switch 172 also may receive voice or data transmissions from telematics unit 120 in mobile vehicle 110 through wireless carrier system 140, communication network 150, and land network 160. Switch 172 may receive from or send to one or more communication services managers 174 data transmissions via one or more bus systems 180. Communication services manager 174 may be any suitable hardware and software capable of providing requested communication services to telematics unit 120 in mobile vehicle 110. Communication services manager 174 may send to or receive from one or more communication services databases 176 data transmissions via bus system 180. Communication services manager 174 may send to or receive from one or more communication services advisors 178 data transmissions via bus system 180. Communication services database 176 may send to or receive from communication services advisor 178 data transmissions via bus system 180. Communication services advisor 178 may receive from or send to switch 172 voice or data transmissions.

Communication services manager 174 provides one or more of a variety of services, including enrollment services, navigation assistance, vehicle personalization, vehicle data upload, vehicle data download, replenish subscriber minutes, unlock/lock vehicle, flash lights, honk horn, perform diagnostic functions and perform vehicle tracking functions. Communication services manager 174 may transmit data to telematics unit 120 in mobile vehicle 110 through wireless carrier system 140, communication network 150, land network 160, voice and data switch 172, and bus system 180. Communication services manager 174 may store or retrieve data and information from communication services database 176. Communication services manager 174 may provide requested information to communication services advisor 178. Communication services manager 174, along with the other components of call center 170, may send over-the-air messages to enable or disable telematics unit 120 through land network 160, communication network 150, and wireless carrier system 140.

Communication services advisor 178 may be a real advisor or a virtual advisor. A real advisor is a human being in verbal communication with a user or subscriber in mobile vehicle 110 via telematics unit 120. A virtual advisor may be a synthesized voice interface responding to requests from telematics unit 120 in mobile vehicle 110. This virtual advisor may include one or more recorded messages.

Communication services advisor 178 provides services to telematics unit 120 in mobile vehicle 110. Possible services provided by communication services advisor 178 are enrollment services, navigation assistance, real-time traffic advisories, directory assistance, roadside assistance, business or residential assistance, information services assistance, emergency assistance, and communications assistance. Communication services advisor 178 may communicate with telematics unit 120 in mobile vehicle 110 through wireless carrier system 140, communication network 150, and land network 160 using voice transmissions, or through communication services manager 174 and switch 172 using data transmissions.

Typically, mobile vehicle 110 initiates a service request to call center 170 by sending a voice or digital-signal command to telematics unit 120 which in turn, sends an instructional signal or a voice call through wireless modem 124, in-vehicle phone 134, wireless carrier system 140, communication network 150, and land network 160 to call center 170. Call center 170 can determine mobile identification numbers and telematics unit identifiers associated with a telematics unit access request, compare mobile identification numbers and telematics unit identifiers with a database of identifier records, and send calling-state messages to the telematics unit based on the request and identification numbers.

FIG. 2 shows a flow diagram of a method to provide access to a telematics unit, according to one embodiment of the present invention at 200. A user inputs into the in-vehicle phone a new mobile identification number (MIN) that has been assigned by a new phone service carrier or new vendor, as seen at block 205. The programming of the telematics unit and its phone may require the user to input a code, such as the last four digits of the electronic serial number of the phone or a personal identification number, to prevent accidental alterations of the programming features.

When the user enters the programming mode, the telematics unit detects that the MIN of the in-vehicle phone has been changed, at which time a computer application of the telematics unit commands the phone to change a bit in its internal memory to a pre-pay setting, as seen at block 210. The pre/post pay bit within the programming code of the telematics unit indicates the billing state of the telematics devices within the vehicle. The pre/post pay bit can be flipped to indicate whether the phone is enrolled in a prepaid or postpaid billing program of the telematics service provider or vendor. Typically there are two types of payment programs for in-vehicle telematics and phone services. In the case of a postpaid program, the user is sent a bill for services already rendered, whereas the user enrolled in a prepaid billing program pays for services such as personal calling minutes, before they are used.

In an alternative embodiment of the present invention, programming code within the phone rather than in the DSP of the telematics unit may detect the change in the phone number and may change automatically the pre/post pay setting to pre-pay. The pre-pay setting requires the user to have prepaid calling minutes in order for the phone to function.

Prepaid minutes may or not be available from the billing program and account with the original vendor or service provider, as seen at block 215.

When the user has no prepaid minutes remaining in a calling plan with the original vendor, the user may try to call with the MIN of a new vendor, as seen at block 220. Because the pre/post-pay bit in the phone has been set to pre-pay and there are no prepaid minutes available, the telematics unit prevents further personal calls with the old MIN or the new MIN, as seen at block 225.

When the user still has prepaid minutes on the calling plan from the original calling plan, the user may call with the newly programmed MIN until the prepaid minutes of the original MIN are depleted, as seen at block 230. For example, if a prepaid calling plan from the original vendor has fifty more minutes of personal calling time available, the user can call with the new MIN for fifty more minutes. Once the prepaid minutes are used up, the telematics unit prevents further personal calls with the new MIN or the old MIN, as seen at block 225.

The user may choose to re-enroll with the original vendor, as seen at block 235. The user may contact the original vendor or calling service provider in order to re-enroll in a phone service. When the user does not re-enroll, the personal calling service in the mobile vehicle remains disabled and the in-vehicle phone and telematics unit cannot be used for personal calling or telematics services, as seen at block 240.

After the user re-enrolls with the original vendor, as seen back at block 235, the user may or may not re-enroll with a prepaid calling plan, as seen at block 245. The user may choose an alternative postpaid billing program from the original vendor, as seen at block 250. After the calling features, payment methods, and other steps of the enrollment process are completed, the original vendor may load the old MIN back into the in-vehicle cellular phone, as seen at block 250. The original MIN or other suitable MIN needs to be loaded into the phone of the telematics unit again before the phone will become operational. The user may input the original MIN back into the code. Alternatively, the vendor may input the original MIN.

The vendor, which typically administers and runs a telematics call center, sends an over-the-air interface message to the telematics unit equipped with the in-vehicle phone, as seen at block 255. One example of an over-the-air interface message, referred to as an air interface function (AIF), may provide a connection from the call center of the vendor to the telematics unit in the mobile vehicle. An alternative process of sending messages utilizes over-the-air service provisioning (OTASP) specified in TIA/EIA/IS-683-A (1998), "Over-the-Air Service Provisioning of Mobile Stations in Spread Spectrum Systems." An SMS message or other suitable communication protocol may alternatively be used to send calling-state messages and other data transfers between the call center and the mobile vehicle.

The message sent from the call center may include a request for the telematics unit to configure the in-vehicle phone with the original MIN and to set the pre/post-pay bit to a post-pay setting. The message may include any other directions necessary to configure the phone for the postpaid calling program. The user may then place or receive personal calls with the first MIN from the original vendor, as seen at block 260.

Rather than enrolling in a postpaid calling program, the user may decide to enroll in the prepaid calling plan with the original vendor, as seen at block 265. The user may program the in-vehicle phone with the original MIN. Alternatively, the in-vehicle telematics unit may program the phone, in response to an over-the-air-interface message sent by the call center, as seen at block 270. The same or another over-the-air-interface message is sent to the telematics unit with instructions for the telematics unit to load additional calling minutes into the in-vehicle phone and to configure any additional settings necessary for the prepaid calling plan. The user is then able to place or receive personal calls with the original MIN of the original vendor, as seen at block 260.

FIG. 3 shows a flow diagram of a method to provide access to a telematics unit, according to one embodiment of the present invention at 300. Access method 300 comprises steps to enable and disable access to a mobile phone embedded in the telematics unit.

A calling-state indicator is set when a mobile identification number (MIN) associated with the telematics unit is altered, as seen at block 305. For example, the calling-state indicator may include a billing state that indicates whether the embedded phone is able to send and receive personal calls through the telematics unit. The billing state may indicate that a calling plan or other suitable arrangements have been appropriately made to allow personal calling. The billing state may consist of a pre-pay state and a post-pay state. The pre-pay state indicates that calls may be made and received using prepaid minutes. A calling-minutes counter may be used to track minutes of time remaining in the prepaid arrangement, counting down towards zero as prepaid time is consumed. The MIN associated with the telematics unit may be changed intentionally, unintentionally, or accidentally when, for example, a user wishes to change the phone number, switch calling plans, change wireless service providers, or otherwise alter the number stored in the phone. When the MIN is changed, microcode running within the telematics unit recognizes the changed MIN and sets the calling-state indicator. In one embodiment, the calling-state indicator is set to pre-pay so that whether a plan associated with the new number is prepaid or postpaid, the phone is automatically set to pre-pay and any prepaid minutes remaining on the phone are used when incoming or outgoing calls are made. In this embodiment, the phone may still be used as long as there are prepaid minutes remaining.

The embedded phone in the telematics unit may be disabled based on the calling-state indicator, as seen at block 310. For example, the embedded phone may be unable to send or receive calls when the calling-state indicator is set to pre-pay and no prepaid minutes remain. A user would recognize that the phone is disabled because the phone would not be able to place outgoing personal calls or receive incoming calls. The phone may, however, still be able to place emergency calls to public service groups and other calls to a call center or other prescribed locations stored within the phone so that assistance can be obtained. Other functions of the telematics unit such as navigational assistance, call center assistance and automated driving directions may or may not remain enabled when personal calls are disabled.

A call center may receive a telematics unit access request corresponding to the telematics unit, as seen at block 315. The request may be made when the telematics unit is unable to make outgoing calls or receive incoming calls, when the MIN is inadvertently changed, or when the telematics unit is otherwise disabled or dysfunctional. The telematics unit access request may be made, for example, by calling the call center from the phone in the telematics unit, a user's phone or a dealer's phone. Alternatively, the telematics unit access request may be made using an Internet application. The request may include information regarding the user's account such as an account number, a telematics unit identifier such as an electronic serial number or portion thereof, a coded security number such as a personal identification number, or any suitable identifier associated with the telematics unit. The request may include, for example, user preferences for a specific MIN, a desired calling plan, a billing preference, or requests for prepaid minutes.

The MIN associated with the telematics unit may be determined, as seen at block 320. The MIN may be determined, for example, by an over-the-air interface command requesting the numbers comprising the MIN, or by use of a caller-identification feature associated with the call placement.

A telematics unit identifier associated with the telematics unit may be determined, as seen at block 320. The telematics unit identifier may be, for example, an electronic serial number stored in the telematics unit, a portion of the electronic serial number such as the last four digits of the serial number, a stored six-digit number, or a coded security number stored within the telematics unit. The telematics unit identifier may be determined, for example, by an over-the-air interface command requesting the telematics unit identifier from the telematics unit.

The MIN and the telematics unit identifier may be compared with a database of identifier records, as seen at block 325. The database of identifier records may contain, for example, an account number, a billing state, a MIN, and a telematics unit identifier associated with the telematics unit. The comparison may be used to check whether the MIN and telematics unit identifier stored in the telematics unit correspond correctly with the MIN and telematics unit identifier in the database.

A calling-state message may be sent to the telematics unit, as seen at block 330. The calling-state message may be sent based on the telematics unit access request, the mobile identification number, and the telematics unit identifier. The calling-state message may be sent using a secure communication link such as an air-interface function. The air-interface function may contain, for example, a relatively short message with a header, a message identifier, and a message body. The calling-state message may include, for example, instructions to store an updated MIN for the embedded phone. The updated MIN may be, for example, a newly assigned MIN, a user-requested MIN, or a repeat of the previously stored MIN.

Software including a program to provide access to the telematics unit may reside, at least in part, at the call center. The program may include computer program code to receive a telematics unit access request, to determine a mobile identification number, and to determine a telematics unit identifier. The program compares the mobile identification number and the telematics unit identifier with a database of identifier records, and sends a calling-state message based on the telematics unit access request. The software may be provided on any suitable computer usable medium such as a compact disc, digital video disc, magnetic media, semiconductor memory, nonvolatile or permanent memory.

The calling-state message may include a calling-state indicator such as a billing state, a pre-pay setting or a post-pay setting. The calling-state message may include an updated preferred roaming list, a home station identifier, entries for an acquisition table, or other parameters for establishing and maintaining wireless communications between the wireless service provider and the embedded phone.

The updated MIN may be stored in the telematics unit, as seen at block 335. The updated MIN may be stored based on the calling-state message, such as when a new MIN or a previously assigned MIN is sent with the calling-state message.

A calling-state indicator may be set within the telematics unit based on a calling-state message, as seen at block 335. The calling-state indicator may be set to indicate, for example, a prepaid billing state or a post-pay billing state. Units of calling time for a prepaid plan may be sent with the calling-state message.

The embedded phone may be enabled, as seen at block 335. The cellular phone embedded in the telematics unit may be enabled based on the calling-state indicator. For example, if the calling-state indicator indicates a prepaid billing state and prepaid minutes are available, the phone may be used for incoming or outgoing phone calls. In another example, if the calling-state indicator indicates a post-pay state and the MIN has been re-set to its original number, then the phone may be used as desired.

Computer program code, which may reside on any suitable computer usable medium such as magnetic, optical, or semiconductor media, can store the updated mobile identification number and calling-state indicator in the telematics unit, and enable the cellular phone. Computer program code to set the calling-state indicator to a predefined billing state and to disable the embedded cellular phone may reside, in part, within the telematics unit and executed by a processing unit within the telematics unit.

The embodiments of the present invention that are described above use the pre-post-pay bit within the computer programming code to control access to the telematics unit and its associated cellular phone with their concomitant services. Alternative programming bits may be used to control access to the MIN and other programming features. For example, a bit may be set that locks out the keypad for numerical entry. Alternatively, certain key entry commands or voice recognition commands may be disabled when unauthorized changes to the MIN are made. Functions of the phone may be disabled, such as roaming features when outside of the home region. Changes to other cellular phone parameters such as a personal identification number or another security code may be made that impair or disable functions of the phone or telematics unit.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of providing access to a telematics unit in a mobile vehicle, comprising:
   receiving a telematics unit access request corresponding to the telematics unit;
   determining a mobile identification number associated with the telematics unit;
   determining a telematics unit identifier associated with the telematics unit;
   comparing the mobile identification number and the telematics unit identifier with a database of identifier records, and
   sending a calling-state message to the telematics unit based on the telematics unit access request, the mobile identification number, and the telematics unit identifier.

2. The method of claim 1 wherein the telematics unit identifier comprises at least a portion of an electronic serial number.

3. The method of claim 1 wherein the telematics unit identifier comprises a coded security number.

4. The method of claim 1 wherein the coded security number comprises a personal identification number.

5. The method of claim 1 wherein the database of identifier records comprises an account number and a billing stare associated with the telematics unit.

6. The method of claim 1 wherein the calling-state message is sent using an air-interface function.

7. The method of claim 1 further comprising:
   storing an updated mobile identification number based on the calling-state message;
   setting a calling-state indicator based on the calling-state message; and
   enabling a cellular phone embedded in the telematics unit based on the calling-state indicator.

8. The method of claim 7 wherein the calling-state indicator comprises a billing state consisting of a pre-pay state and a post-pay state.

9. The method of claim 1 further comprising:
   setting a calling-state indicator to a predefined billing state when the mobile identification number associated with the telematics unit is altered.

10. The method of claim 9 wherein the calling-state indicator comprises a billing state.

11. The method of claim 10 wherein the billing state is set to a pre-pay state.

12. The method of claim 1 further comprising:
    disabling a cellular phone embedded in the telematics unit based on a calling-state indicator.

13. The method of claim 1 wherein the calling-state message includes at least one information selected from the group consisting of: an updated MIN for the telematics unit, billing state, a pre-pay setting or a post-pay setting, updated preferred roaming list, a home station identifier, entries for an acquisition table, and parameters for establishing and maintaining wireless communications between the wireless service provider and the embedded phone.

14. A computer usable medium including a program to provide access to a telematics unit in a mobile vehicle, comprising:
    computer program code to receive a telematics unit access request corresponding to the telematics unit;
    computer program code to determine a mobile identification number associated with the telematics unit;
    computer program code to determine a telematics unit identifier associated with the telematics unit;
    computer program code to compare the mobile identification number and the telematics unit identifier with a database of identifier records; and
    computer program code to send a calling-state message to the telematics unit based on the telematics unit access request, the mobile identification number, and the telematics unit identifier.

15. The computer usable medium of claim 14 further comprising:
    computer program code to store an updated mobile identification number based on the calling-state message;
    computer program code to set a calling-state indicator based on the calling-state message; and
    computer program code to enable a cellular phone embedded in the telematics unit based on the calling-state indicator.

16. The computer usable medium of claim 14 further comprising:
    computer program code to set a calling-state indicator to a predefined billing state when the mobile identification number associated with the telematics unit is altered.

17. The computer usable medium of claim 14 further comprising:
    computer program code to disable a cellular phone embedded in the telematics unit based on a calling-state indicator.

18. A system for providing access to a telematics unit in a mobile vehicle, comprising:
    means for receiving a telematics unit access request corresponding to the telematics unit;
    means for determining a mobile identification number associated with the telematics unit;
    means for determines a telematics unit identifier associated with the telematics unit;
    means for comparing the mobile identification number and the telematics unit identifier with a database of identifier records; and
    means for sending a calling-state message to the telematics unit based on the telematics unit access request, the mobile identification number, and the telematics unit identifier.

19. The system of claim 18 further comprising:
    means for storing an updated mobile identification number based on the calling-state message;
    means for setting a calling-state indicator based on the calling-state message, and means for enabling a cellular phone embedded in the telematics unit based on the calling-state indicator.

20. The system of claim 18 further comprising:
means for setting a calling-state indicator to a predefined billing state when the mobile identification number associated with the telematics unit is altered.

21. The system of claim 18 further comprising:
means for disabling a cellular phone embedded in the telematics unit based on a calling-state indicator.

* * * * *